US011652693B2

(12) United States Patent
Opsenica et al.

(10) Patent No.: US 11,652,693 B2
(45) Date of Patent: May 16, 2023

(54) EDGE CLOUD ANCHORING

(71) Applicant: Telefonaktiebolaget LM Ericsson (PUBL), Stockholm (SE)

(72) Inventors: Miljenko Opsenica, Espoo (FI); Tero Kauppinen, Espoo (FI); Miika Komu, Helsinki (FI); Timo Simanainen, Veikkola (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/639,623

(22) PCT Filed: Sep. 4, 2019

(86) PCT No.: PCT/SE2019/050827
§ 371 (c)(1),
(2) Date: Mar. 2, 2022

(87) PCT Pub. No.: WO2021/045661
PCT Pub. Date: Mar. 11, 2021

(65) Prior Publication Data
US 2022/0294698 A1   Sep. 15, 2022

(51) Int. Cl.
*H04L 41/0895* (2022.01)
*H04L 67/10* (2022.01)
(Continued)

(52) U.S. Cl.
CPC ...... *H04L 41/0895* (2022.05); *H04L 12/4641* (2013.01); *H04L 41/0654* (2013.01); *H04L 61/4511* (2022.05); *H04L 67/10* (2013.01)

(58) Field of Classification Search
CPC ............ H04L 41/0895; H04L 41/0654; H04L 61/4511; H04L 12/4641; H04L 67/10
(Continued)

(56) References Cited

U.S. PATENT DOCUMENTS

2013/0283364 A1* 10/2013 Chang ................ G06F 9/45558
                                                          726/12
2013/0311778 A1* 11/2013 Cherukuri ........... H04L 67/1001
                                                          713/171
(Continued)

FOREIGN PATENT DOCUMENTS

CN        111885113 A  * 11/2020 ............. G06Q 50/01

OTHER PUBLICATIONS

DNS SRV Record Support—OpenVPN Support Forum by Barry Quiel—Aug. 28, 2013.
UsefulVid: How to Set up OpenVPN With a AirVPN Config File (Windows), YouTube—Feb. 21, 2015.
Provider Provisioned CE-Based Virtual Private Network Solution Using IPSEC and HTTP, Internet Draft by Jeremy De Clercq et al., Nortel Networks—Feb. 2003.
(Continued)

*Primary Examiner* — Ruolei Zong
(74) *Attorney, Agent, or Firm* — Baker Botts L.L.P.

(57) ABSTRACT

The present disclosure relates to a method for anchoring an edge cloud to a central cloud, the method being performed in a cloud environment comprising a central cloud and an edge cloud, the method comprising obtaining (S238, S310), by a connectivity controller of an edge cloud, an address of an anchoring registry of a central cloud; sending (S240, S312), by the connectivity controller, to the anchoring registry, information about networking configuration of the edge cloud; setting up (S246, S314), by an orchestrator of the central cloud, a virtual private network, VPN, service in the central cloud; requesting (S248, S316), by the orchestrator of the central cloud, edge VPN configuration information from the central VPN service, based on the information about networking configuration of the edge cloud; sending (S252, S318), by the anchoring registry, the edge VPN configuration information, to an orchestrator of the edge cloud; creating (S258, S320), by an orchestrator of the edge cloud, an edge VPN service, based on the edge VPN configuration information; and establishing (S260, S322) a VPN connection between the edge VPN service and the central VPN service, whereby services from either one of the
(Continued)

1: Registration
2: Anchoring allocation
3: Allocation of central VPN
4: Configuration of anchoring point
5: Anchoring allocation
6: Allocation of edge VPN
7: VPN connection establishment
8: Services registration
9: Query services edge cloud or the central cloud are exposed in the edge cloud and the central cloud.

14 Claims, 10 Drawing Sheets

(51) Int. Cl.
*H04L 12/46* (2006.01)
*H04L 61/4511* (2022.01)
*H04L 41/0654* (2022.01)

(58) Field of Classification Search
USPC .......................................................... 709/223
See application file for complete search history.

(56) References Cited

U.S. PATENT DOCUMENTS

| | | | |
|---|---|---|---|
| 2017/0017907 A1* | 1/2017 | Narasimhan | H04L 63/029 |
| 2017/0099188 A1* | 4/2017 | Chang | H04L 12/4633 |
| 2018/0048588 A1 | 2/2018 | Beesley et al. | |
| 2019/0075083 A1* | 3/2019 | Mayya | H04L 63/0272 |

OTHER PUBLICATIONS

PCT International Preliminary Report on Patentability issued for International application No. PCT/SE2019/050827—dated Dec. 15, 2021.
PCT International Search Report issued for International application No. PCT/SE2019/050827—dated May 8, 2020.
PCT Written Opinion of the International Searching Authority issued for International application No. PCT/SE2019/050827—dated May 8, 2020.

* cited by examiner

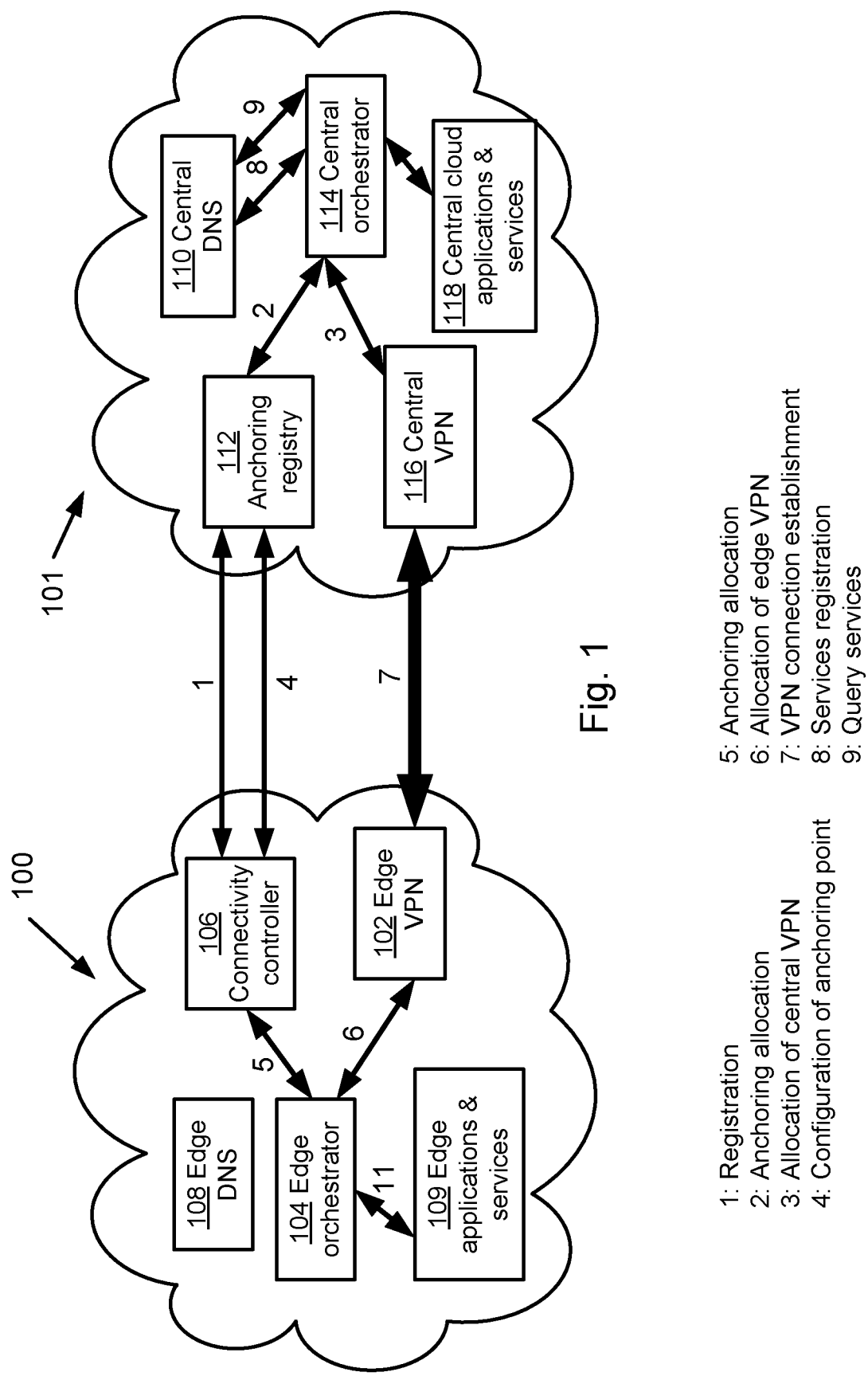

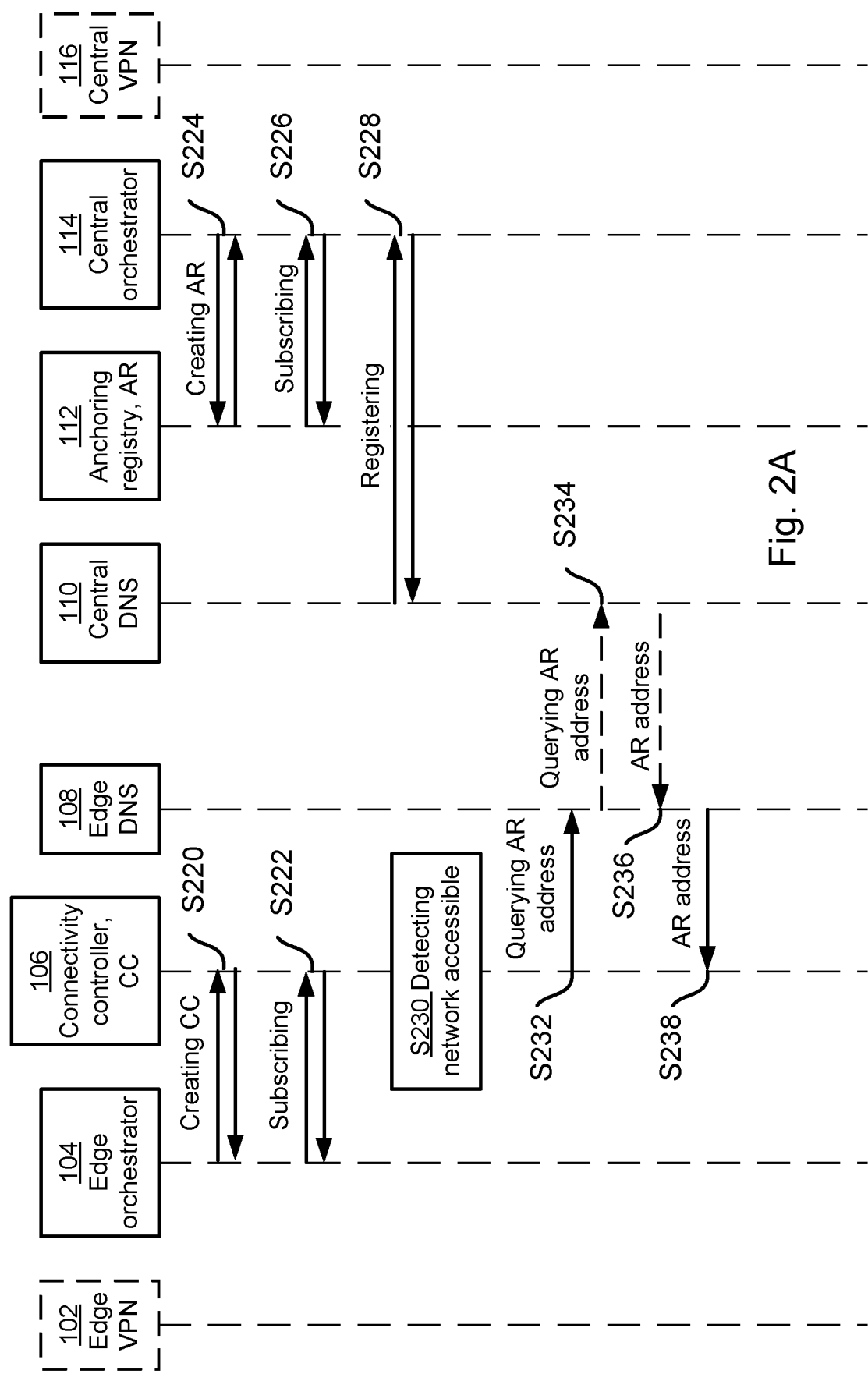

EDGE CLOUD ANCHORING

PRIORITY

This nonprovisional application is a U.S. National Stage Filing under 35 U.S.C. § 371 of International Patent Application Serial No. PCT/SE2019/050827 filed Sep. 4, 2019 and entitled "EDGE CLOUD ANCHORING" which is hereby incorporated by reference in its entirety.

TECHNICAL FIELD

The present invention relates to a method for anchoring an edge cloud to a central cloud.

BACKGROUND

Applications and services are commonly provided using cloud technology. Commonly a central cloud is connected to a communications network, and is providing applications and services to devices coupled to and/or connected to the communications network.

There is an existing trend of shifting provided applications/services closer to the edge of the communications network, e.g. to edge clouds comprised in vehicles, such as cars and sea vessels. The number of edge clouds supporting that trend, has been growing exponentially all around the globe. Looking ahead, the number of edge clouds may increase by orders of magnitude. The edge clouds may send content and applications/apps to users over shorter lengths of fiber and wireless network hops, supporting the ultra-low latency and extreme throughput demanded by different industry use cases, such as IoT and 5G use cases.

Despite decentralization trend of clouds, synchronization of the edge cloud and related edge services with the central cloud is still needed. Synchronization in this context may e.g. include exchanging data flows, aggregate data flows and various management controls. Anchoring of the edge cloud, i.e. interconnecting with the central cloud, enables end-to-end, e2e, use cases, and provides additional service/application values by utilizing distributed pools of data and resources. The anchoring or interconnection may e.g. be performed via VPN-based connectivity.

Conventional solutions perform anchoring of the edge clouds to one or more central clouds using static/manual procedures, which leads to limitations and incompatibility of various proprietary solutions. In the some extreme cases, edge clouds are provided with very limited connectivity. In other words, edge clouds have been rather isolated private islands with the very limited synchronization capabilities with central clouds.

Discovery of edge services and multitenancy are additional challenges in the distributed edge cloud ecosystem. In order to enable and optimize edge ecosystem with a growing number of providers, resource pools needs to be shared among the tenants and related services. At the same time, the applications/services offered by edge clouds need to be discoverable across the used resource domains and at the same time support privacy isolation requirements.

One important challenge is therefore related to the edge cloud anchoring procedure, and how to support related requirements on both privacy and service discovery.

Traditionally services have been exposed via the central cloud portals, using more fixed pre-defined access points and portals. At a same time, edge clouds often require a more dynamic and flexible service exposure solution, where service can be used more in an "ad-hoc" or sporadic fashion. In order to support such dynamicity, edge cloud anchoring process and edge cloud service exposure should be rather simple and support heterogenous clouds.

Thus, there is a need for an improved method for anchoring edge clouds.

SUMMARY OF THE INVENTION

The above objective is achieved by the subject matter described herein. Further advantageous implementation forms of the invention are described herein.

According to a first aspect of the invention the objects of the invention is achieved by a method for anchoring an edge cloud to a central cloud, the method being performed in a cloud environment comprising a central cloud and an edge cloud, the method comprising obtaining, by a connectivity controller of an edge cloud, an address of an anchoring registry of a central cloud; sending, by the connectivity controller, to the anchoring registry, information about networking configuration of the edge cloud; setting up, by an orchestrator of the central cloud, a virtual private network, VPN, service in the central cloud; requesting, by the orchestrator of the central cloud, edge VPN configuration information from the central VPN service, based on the information about networking configuration of the edge cloud; sending, by the anchoring registry, the edge VPN configuration information, to an orchestrator of the edge cloud; creating, by an orchestrator of the edge cloud, an edge VPN service, based on the edge VPN configuration information; and establishing a VPN connection between the edge VPN service and the central VPN service, whereby services from either one of the edge cloud or the central cloud are exposed in the edge cloud and the central cloud.

At least one advantage of the first aspect is that an automated anchoring solution is provided.

According to a second aspect of the invention the objects of the invention is achieved by method for anchoring an edge cloud to a central cloud, the method being performed in an edge cloud, comprising obtaining, by a connectivity controller, an address to an anchoring registry of a central cloud; sending, by the connectivity controller, to the anchoring registry, information about networking configuration of the edge cloud; receiving, by an orchestrator of the edge cloud, from an anchoring registry, edge virtual private network, VPN, configuration information; and creating, by the orchestrator, an edge VPN service in the edge cloud to establish a VPN connection between the edge VPN service of the edge cloud and the central VPN service of the central cloud, whereby services in either one of the two, can be exposed in the edge cloud and in the central cloud.

According to a third aspect of the invention the objects of the invention is achieved by a method for anchoring of an edge cloud to a central cloud, the method being performed in the central cloud, the method comprising receiving, by an anchoring registry, from a connectivity controller of the edge cloud, information about networking configuration of the edge cloud; setting up, by an orchestrator of the central cloud, a virtual private network, VPN, service in the central cloud; querying, by the orchestrator, configuration information for an edge VPN service, based on received information about networking configuration of the edge cloud, from the VPN service in the central cloud; and sending, by the anchoring registry, the edge VPN configuration information, to an orchestrator of the edge cloud, such that a VPN connection can be established between the edge cloud and the central cloud, whereby services in either one of the two, can be exposed in the edge cloud and in the central cloud.

According to a fourth aspect of the invention the objects of the invention is achieved by a computer program comprising computer-executable instructions for causing a cloud, when the computer-executable instructions are executed on processing circuitry comprised in the cloud to perform any of the method steps according to any of the first, second or third aspect.

The advantages of the second, third and fourth aspect are at least the same as for the first aspect.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly

BRIEF DESCRIPTION OF THE DRAWINGS

FIG. 1 illustrates anchoring of an edge cloud to a central cloud according to one or more embodiments of the present disclosure.

FIG. 2A shows a sequence flow of a method according to one or more embodiments of the invention.

Figure 2B:
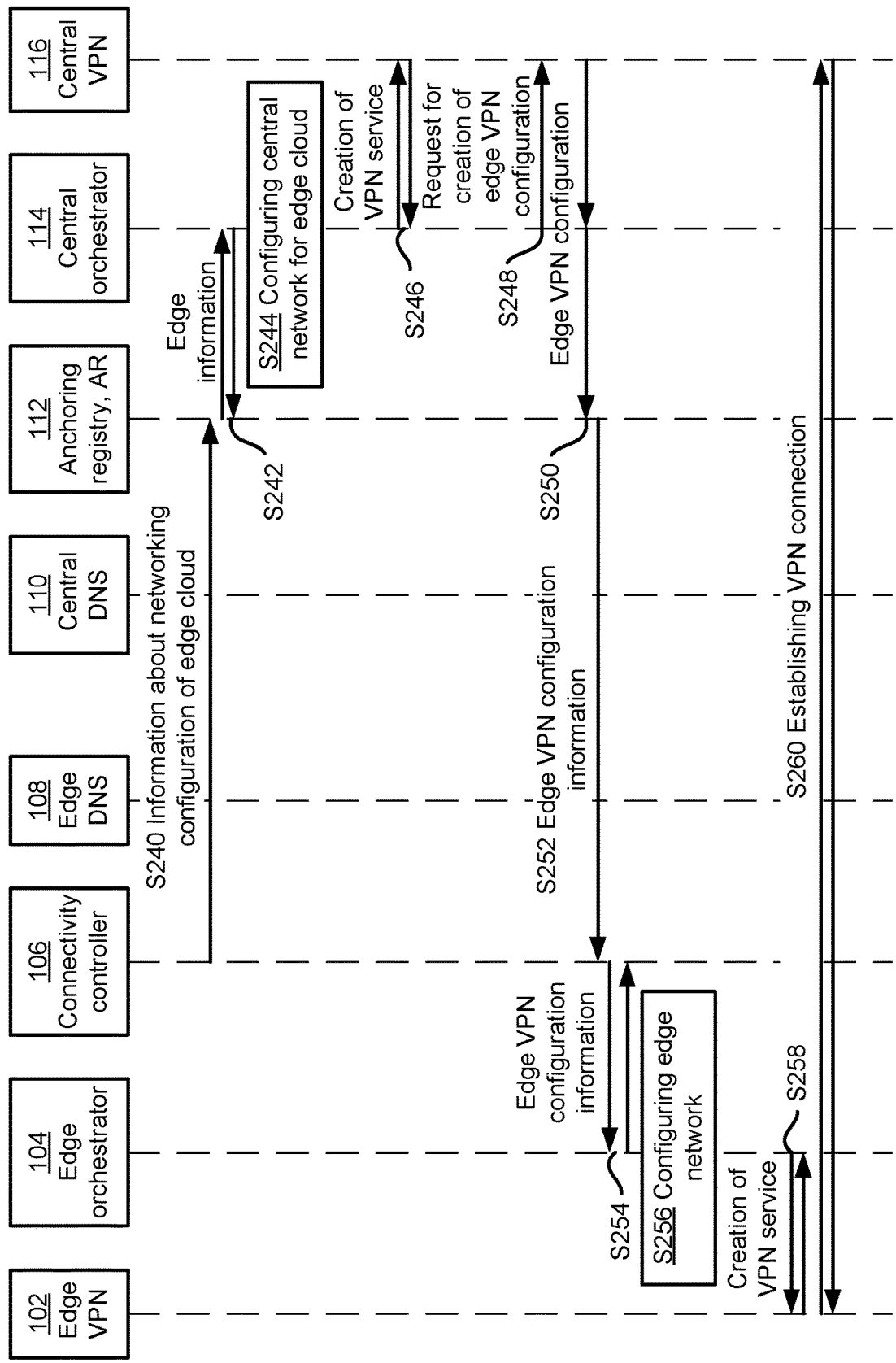
FIG. 2B shows a sequence flow of a method according to one or more embodiments of the invention.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Autonomous stationary or moving entities (such as factory edge system or vehicles, e.g. cars and sea vessels) may carry a small datacenter, i.e. an edge cloud that can be connected to larger datacenters, i.e. a local/regional/central cloud. One of the challenges with such edge cloud solutions is that a carried edge cloud may move outside the range of wireless (2G/3G/4G/5G/Wi-Fi/satellite) access. Thus, such carried edge clouds need to be autonomous, i.e., operational even without connectivity to one or more local/regional/central clouds. However, when the edge cloud regains connectivity, it should be seamlessly interconnected with the central cloud in order to share resources, e.g. to provide applications and services. In this patent, we propose a solution to anchor or interconnect edge clouds (with possibly intermittent connectivity) to central clouds (with more stable connectivity) in a dynamic and automated way, typically using VPN-based connectivity and DNS service discovery. In one example, the solution of the present disclosure was implemented using Linux containers and Kubernetes.

The present disclosure aims to provide an automated anchoring solution for the heterogeneity of the edge clouds. The present disclosure further aims to provide seamless integration of the any edge cloud with the central cloud, simple exposure/discovery of the services provided by the edge cloud. The present disclosure further aims to provide generic edge cloud management solution, enabling multi-tenancy, and edge network slicing "on demand", and support of the multi-access edge computing. The term "Multi-tenancy" refers herein to e2e tenant isolation of resources/workloads in the form of isolated network slice. Edge anchoring solution focuses more on isolation of the networking resources (tenant VPN, VPN agents) while isolation of the central cloud workloads is handled via central orchestrator (here focus only on dedicated VPN Agent). The term "Slicing" refers to a concept already established as a 5G resource management/utilization concept focusing on defined 3GPP use cases. In the present disclosure, this means that the edge cloud can be attached/de-attached to the central cloud more dynamically anywhere in the network.

The present disclose provides the advantages of:

Enabling automated anchoring solution for the heterogeneous edge clouds (connectivity, using PubSub, VPN and DNS service discovery based solution).

Can be utilized also in the context of hybrid clouds (i.e., private-public cloud combination).

Enables on demand edge cloud anchoring independently of dynamicity requirements.

Enables anchoring/exposure/discovery of the edge cloud applications/services.

Can be used for instance for CDN based edge cloud domain anchoring with the central cloud.

Provides generic edge computing management solution utilizing orchestration anchoring solution.

Enables edge cloud multitenancy utilizing the logical network isolation as part of anchoring solution.

Provides the multi-access edge computing to enable IoT and 5G use cases.

Is a proven solution, as the approach has been proven to work because on a testbed implemented it using Linux containers and Kubernetes.

The solution of the present disclosure comprises to anchor or to interconnect edge clouds (with possibly intermittent connectivity) to central clouds (with more stable connectivity) in a dynamic and automated way using VPN-based connectivity and DNS service discovery mechanisms.

FIG. 1 illustrates anchoring of an edge cloud 100 to a central cloud 101 according to one or more embodiments of the present disclosure. The boxes illustrate functional modules or software instances, each configured to perform certain functionality.

In this patent, we propose a solution to interconnect edge clouds (with possibly intermittent connectivity) to central clouds (with more stable connectivity) in a dynamic and automated way using VPN-based connectivity and DNS service discovery mechanisms. FIG. 1 shows an edge cloud 100 interconnected to one central cloud, but more clouds could be interconnected using the solution. According to one aspect, the solution addresses the challenge of intermittent connectivity, i.e., it is assumed that the edge cloud can remain autonomous operation even if communications network connectivity with the central cloud is lost. However, when network connectivity is again available, the edge cloud automatically reconnects to the central cloud, so that it can accept workloads from the central cloud, and/or send workloads to the central cloud. In the proposed disclosure, both the edge and central cloud have separate orchestrators 104, 114 that are configured to create VPN end-points 102, 116 (called VPN functional modules) in the edge and central cloud 100, 101. At the edge cloud 100, a functional module called anchoring registry 112 is configured to detect network connectivity, and aids in setting up/configure the VPN functional modules 102, 116. At the central cloud, a publish-subscribe service of the anchoring registry 112 comprises the necessary or required information about the VPN set up that the anchoring gateway requires. The edge clouds further discovers the location of the pub-sub service or anchoring registry 112 via the DNS service or central DNS 110 of the central cloud 101. Please refer to FIG. 2 for more details.

As shown in FIG. 1, the edge cloud (100) comprises the edge virtual private network, EVPN, client functional module 102, the edge orchestrator, EO, functional module 104, a connectivity controller, CC, functional module 106, an edge dynamic name server, EDNS, functional module 108 and an edge applications & services, EA&S, functional module 109.

The edge virtual private network, VPN, functional module 102 is typically configured to provide a VPN client at a client endpoint of a VPN tunnel. The VPN tunnel or VPN connection is typically established between a VPN Server and a VPN Client, each representing an endpoint of the VPN tunnel. A VPN client can typically only establish a connection with just one server at a time. However, a VPN server can accept connections from many clients. With reference to FIG. 1, a VPN tunnel is established between the edge VPN functional module 102 and the central VPN server functional module 116.

The edge orchestrator functional module 104 is typically configured to manage services and component/workloads in the corresponding edge cloud 100. Orchestration typically can include service orchestration, components/functions management, resource management, cloud management. In the present disclosure, we focus more on service dependencies management and selective lifecycle management of VPN establishment components. As shown in FIG. 2. step S254, VPN connectivity service dependency is received (available anchoring point). The configuration received here is used as dependency to central anchoring point in VPN service establishment. In FIG. 2 step S258, a creation of edge VPN connectivity service and components, such as the VPN Agent, is triggered.

The connectivity controller, CC, functional module 106 is typically configured to monitor the status of the physical link, S230, and to manage the registration information of the edge cloud (100), e.g. in step S240, at an anchoring registry functional module 112. In addition, the CC, relays VPN configuration information obtained in S252, received from an AR functional module 112, to the edge orchestrator functional module 104, e.g. in step S254.

The edge dynamic name server, DNS, functional module 108 is typically configured to receive host IP registration from the edge orchestrator 104 and the edge applications & services functional module 109. Also the edge DNS, functional module 108 is configured to receive service registration from the edge applications & services functional module 109. 108 will also respond to DNS queries from all the edge nodes 102, 104, 106, 109 and from the central DNS functional module 110.

The edge applications & services functional module 109 is typically configured to run the applications and services running in the edge cloud, which 104 manages. What is particular to these applications and services, is that they are configured to communicate with services running in the central cloud 101.

The central cloud 101 comprises a central dynamic name server, CDNS, functional module 110, an anchoring registry, AR, functional module 112, a central orchestrator, CO, functional module 114, a central virtual private network, CVPN, server functional module 116 and a central applications & services, CA&S, functional module 118.

The central DNS functional module 110 is typically configured to receive zone registration from the edge dynamic name server, DNS, functional module 108. The central DNS functional module 110 will also receive service and host registration from all the central the central nodes 112, 114, 116, and 118. Additionally it will receive DNS queries from the edge DNS functional module 108, central nodes 112, 114, 116, 118 and also from external networks.

The anchoring registry, AR, functional module 112 is typically configured to keep record of the edge cloud 100 registration information, e.g. in step S240. In addition, the anchoring registry, AR, relays configuration requests, S242, to a central orchestrator, CO, functional module 114. The AR also communicates the edge VPN configuration, e.g. obtained in S250, received from a CO, functional module 114, to the CC, functional module 106, S252.

The central orchestrator, CO, functional module 114 is typically configured to typically manage services and service components in the central cloud 101. The CO can also have aggregation roles where dependencies to other cloud domains can be managed. For instance, VPN connectivity service connecting edge workloads with central cloud functionality should be coordinated together in cases where the configuration used by edge VPN agent to interconnect with central cloud agent need to be synchronized. Orchestration typically can include service orchestration, components/functions management, resource management, cloud management. Examples of tasks include service dependencies management and selective lifecycle management of VPN establishment components.

In an example, with reference to FIG. 2:

Step S242: Central orchestrator receives intent of edge domain to connect to the central cloud with optional information on the services the edge wants to share/expose.

Step S244: CO does network configuration as pre-requirement of the new VPN service instance.

Step S246: CO creates central cloud VPN connectivity service in order to expose anchoring functionality to the edge domain.

Step S248: CO requests service anchoring configuration that can be used in the edge cloud VPN agent for VPN connectivity establishment. CO forwards the configuration to the edge orchestrator functional module 104 via an anchoring registry, AR, functional module 112.

The central virtual private network, VPN, functional module 116 is typically configured to provide a VPN server at a server endpoint of a VPN tunnel. The VPN tunnel or VPN connection is typically established between a VPN Server and a VPN Client, each representing an endpoint of the VPN tunnel. The VPN client can typically only establish a connection with just one server at a time. However, the VPN server can accept connections from multiple clients. With reference to the example shown in FIG. 1, a VPN tunnel is established between the edge VPN functional module 102 and the central VPN server functional module 116.

The central applications & services functional module 118 is typically configured to run the applications and services running in the central cloud 101, which CO 114 manages. What is particular to these applications and services, is that they are configured to communicate with services running in the edge cloud 100

In FIG. 1 a high level overview of the method steps of the present disclosure is shown.

Step 1: (Authentication) and registration—the edge cloud 100 discovers the anchoring registry service (pub/sub) 112 and registers with optional metadata on exposed services in the edge DNS 108 domain. In other words, the connectivity controller functional module 106 obtains an address of the anchoring registry functional module 112. The connectivity controller, CC, functional module 106 then sends information about a networking configuration of the edge cloud to the anchoring registry to the anchoring registry functional module 112. In one embodiment, information about edge presence or registration is further included, and the AR functional module 112 starts a registration timer which expires unless the CC functional module 106 refreshes the registration.

Step 2: Anchoring allocation—the anchoring registry 112 or Pub/Sub gateway authenticates the edge DNS 108 domain and orders the central orchestrator, CO, functional module 114 to allocate anchoring slice resources, including a VPN Agent or central VPN server functional module 116, from a preferred back-end cloud domain. In other words, the CO functional module 114 is configured to set up a virtual private network, VPN, service or central VPN server functional module 116 in the central cloud 101.

Step 3a: Allocation of central VPN—the CO, functional module 114 is now onboard and is configured to deploy a network slice where some existing network resources can be reused. In other words, the CO functional module 114 is ready to request edge VPN configuration information from the central VPN service, based on the information about networking configuration of the edge cloud.

Step 3b: Requesting edge VPN configuration information—the CO requests edge VPN configuration information from the central VPN service, VPN Agent or central VPN server functional module 116 based on the information about networking configuration of the edge cloud.

Step 4: Propagating anchoring slice resources to edge cloud—the established anchoring point configuration is propagated back to the edge cloud. In other words, the information indicative of the anchoring slice resources are sent or signaled to the edge cloud.

Step 5: Requesting establishment of edge anchoring resources—the anchoring GW or anchoring registry 112 requests or orders, the local orchestrator or edge orchestrator functional module 104, allocation of the edge anchoring resources, such as the VPN client agent or edge VPN functional module 102, with VPN server agent configuration inputs or the edge VPN configuration information.

Step 6: Local edge orchestrator onboard and deploying requested resources—the EO functional module 104 is now onboard and is configured to deploy requested edge anchoring resources. In other words, the EO creates an edge VPN service, based on the edge VPN configuration information.

Step 7: Edge orchestrator triggers VPN tunnel establishment—the EO 104 establishes a VPN connection or tunnel between the edge VPN service or EVPN client functional module 102, and the central VPN service or CVPN, server functional module 116.

Step 8: Edge DNS server is integrated where backend orchestrator can optionally add anchored edge services into the central service inventory—services from either one of the edge cloud or the central cloud are exposed in the edge cloud and the central cloud. In other words, the CO functional module 114 add anchored edge services provided by the EA&S functional module 109 into the service inventory of the CA&S functional module 118, and the EO functional module 104 add anchored central services provided by the CA&S functional module 118 into the service inventory of the EA&S functional module 109.

Step 9: Services are queried by the CO functional module 114.

FIG. 2A shows a sequence flow of a method according to one or more embodiments of the invention.

The various functional modules of the edge cloud 100 and central cloud 101 are shown at the top of the diagram. As mentioned in relation to FIG. 1, the edge cloud 100 comprises the EVPN client functional module 102, the EO functional module 104, the CC functional module 106, the EDNS functional module 108 and the EA&S functional module 109. The central cloud 101 comprises the CDNS functional module 110, the anchoring registry, AR, functional module 112, the CO functional module 114, the CVPN server functional module 116 and the CA&S functional module 118. The method comprises the steps:

In an optional step S220, EO functional module 104 sets up the CC functional module 106. In other words, the edge orchestrator creates a Connectivity Controller (or CC) service (e.g. a virtual machine or a Linux container) at the edge cloud. NOTE: this step is optional in the case the edge orchestrator 104 has already pre-created the service, This step is required to be done only when bootstrapping the edge cloud.

In a further optional step S222, the 3 EO functional module 104 registers as a notification receiver with the CC functional module 106 in order to receive configuration information from the central cloud. NOTE: this step is optional in the case it has been done already beforehand. This step is required to be done only when bootstrapping the edge cloud.

In an optional step S224, the CO functional module 114 creates an AR functional module 112 (e.g. a virtual machine or a Linux container) at the central cloud 101. NOTE: this step is optional in the case the central cloud has already pre-created the service—this step is required to be done only when bootstrapping the edge cloud In an optional step S226, the CO functional module 114 subscribes or registers as a notification receiver with the AR in order to receive information about connecting edge.

In an optional step S228, the CO functional module 114 registers a FQDN/SRV record for the AR functional module 112 in the CDNS functional module 110. In this disclosure, this refers to Fully Qualified Domain Name (FQDN) and service record (SRV). Note: this step is optional in the case the record has already been published in the DNS.

The edge cloud 100 is initially disconnected from the network.

In an optional step S230, the CC functional module 106 detects that the network is accessible, e.g. receives a link-up notification from an external source.

Since the network is now accessible, in an optional step S232, the CC functional module 106 queries the EDNS functional module 108 of the address of the AR service or AR functional module 112.

If the EDNS functional module 108 has cashed records of the address of AR functional module 112, the EDNS functional module 108 will return the address of AR functional module 112 to the CC functional module 106. If the EDNS functional module 108 don't have cashed records of the address of AR functional module 112, in optional step S234 it recursively queries from the authoritative server, i.e., the CDNS functional module 110. In optional step S236, the CDNS functional module 110 then responds with the records of the address of AR functional module 112 to the EDNS functional module 108. Note: another way to implement this is iterative querying, i.e., the EDNS functional module 108 would ask the CC functional module 106 to directly request the CDNS functional module 110.

In an optional step S238, the EDNS functional module 108 forwards the cashed records of the address of AR functional module 112, e.g. SRV record/IP address information of the AR functional module 112, to the CC functional module 106.

FIG. 2B shows a sequence flow of a method according to one or more embodiments of the invention.

The various functional modules of the edge cloud 100 and central cloud 101 are shown at the top of the diagram. As mentioned in relation to FIG. 1, the edge cloud 100 comprises the EVPN client functional module 102, the EO functional module 104, the CC functional module 106, the EDNS functional module 108 and the EA&S functional module 109. The central cloud 101 comprises the CDNS functional module 110, the anchoring registry, AR, functional module 112, the CO functional module 114, the CVPN server functional module 116 and the CA&S functional module 118. The method is typically performed after the optional steps described in relation to FIG. 2A, and comprises the steps:

Step S240: sending, by the CC functional module 106, to the AR functional module 112, information about a networking configuration of the edge cloud 100. The CC publishes information about the networking configuration of the edge cloud. The CC subscribes also at this stage to receive information from the central cloud 101.

In an optional Step S242, the AR, functional module 112 sends information of edge cloud events to the CO functional module 114. The orchestrator of the central cloud has earlier subscribed to receive information about edge cloud events, and now it received information about the CC published in the previous two steps.

In an optional Step S244: configuring the central network for the edge cloud 100, by the CO functional module 114.

Step S246: setting up, by the CO functional module 114, CVPN, server functional module 116 or VPN, service in the central cloud 101. In other words, the CO functional module 114 creates an VPN server-side service (e.g. a virtual machine or Linux container) for the edge cloud 100.

Step S248: requesting, by the CO functional module 114, edge VPN configuration information from the central VPN service or CVPN, server functional module 116, based on the information about networking configuration of the edge cloud. In other words, the central cloud orchestrator requests the VPN server to create a client configuration for the connecting edge cloud.

In optional Step S250, sending the edge VPN configuration information from the CVPN, server functional module 116 to the AR functional module 112, via the CO functional module 114.

Step S252: sending, by the AR functional module 112, the edge VPN configuration information, to the CC functional module 106 of the edge cloud 100.

In optional Step S254: the EO functional module 104 acknowledges the edge VPN configuration information with the CC functional module 106.

In optional Step S256: configuring the edge network, by the EO functional module 104.

Step S258: creating, by the EO functional module 104, an edge VPN service or EVPN client functional module 102, based on the edge VPN configuration information. In other words, the edge cloud orchestrator or EO functional module 104 creates a VPN client-side service (i.e. a virtual machine or Linux container) or EVPN client functional module 102 using the VPN client configuration retrieved in the previous steps S248-S254.

Step S260: establishing, by the EVPN client functional module 102, a VPN connection between the edge VPN service or EVPN client functional module 102 and the central VPN service or CVPN server functional module 116. In other words, the VPN client (located in the edge cloud 100) creates a two-way VPN tunnel with the VPN server (located in the central cloud 101). After this method step, the virtual services located in the edge cloud can reach the virtual services located in the central cloud, and vice versa.

Thus, services from either one of the edge cloud 100 or the central cloud 101 are exposed in the edge cloud 100 and the central cloud 101.

Figure 3:
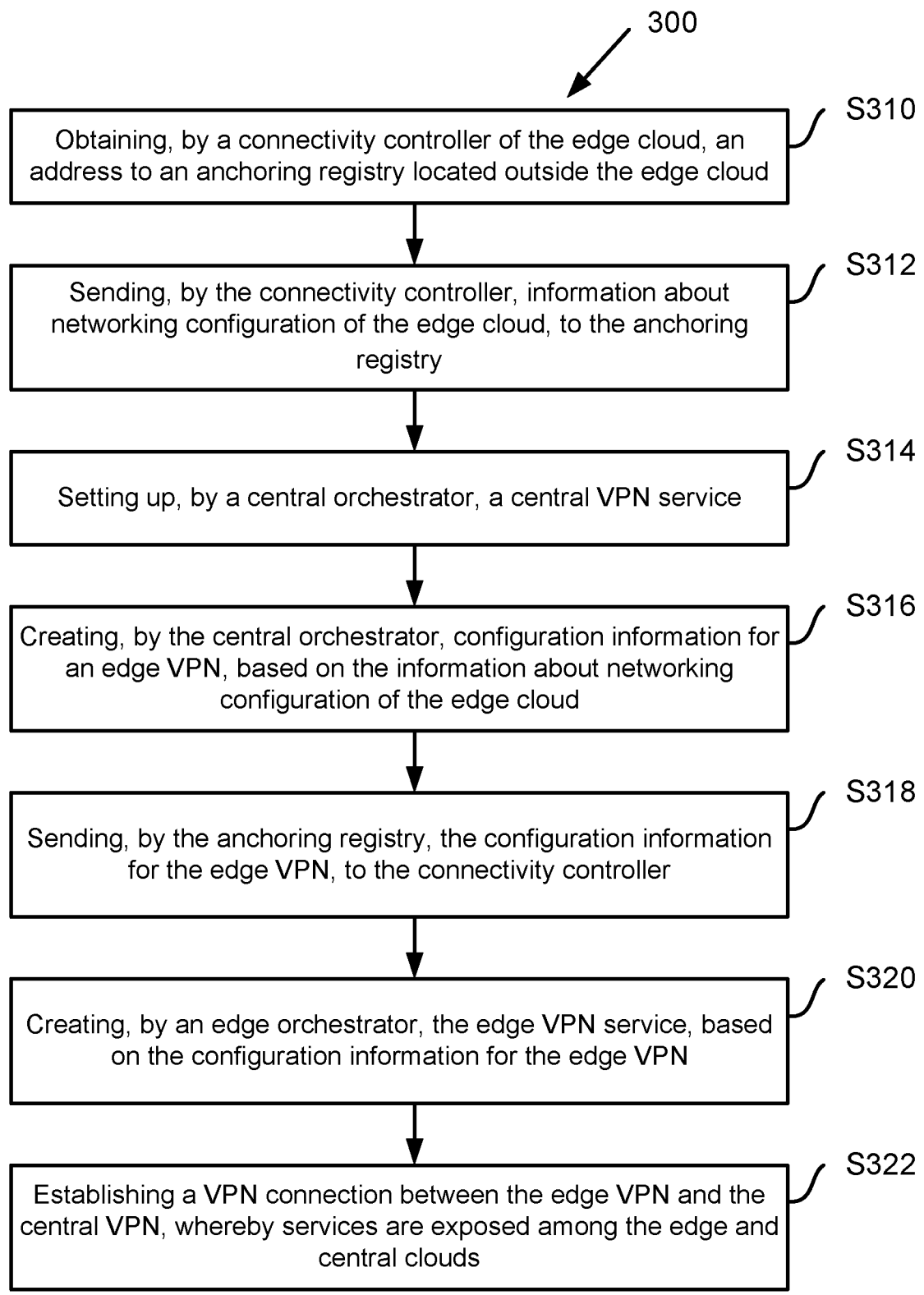
FIG. 3 shows a flowchart of a method according to one or more embodiments of the present disclosure.

FIG. 3 shows a flowchart of a method according to one or more embodiments of the present disclosure. A method 300 is provided for anchoring an edge cloud 100 to a central cloud 101. The method being performed in a cloud environment comprising an edge cloud 100 and a central cloud 101.

The method comprising the following optional steps:

Step S310: Obtaining, by a connectivity controller of the edge cloud, an address to an anchoring registry located outside the edge cloud. E.g. by S238: obtaining, by a connectivity controller of an edge cloud or CC functional module 106, an address of an anchoring registry of a central cloud or AR functional module 112;

Step S312: Sending, by the connectivity controller, information about networking configuration of the edge cloud, to the anchoring registry. E.g. by S240: sending by the connectivity controller or CC functional module 106, to the anchoring registry or AR functional module 112, information about a networking configuration of the edge cloud.

Step S314: Setting up, by a central orchestrator, a central VPN service. E.g. by S246: setting up, by an orchestrator of the central cloud or the CO functional module 114, a virtual private network, VPN, service in the central cloud or the CVPN server functional module 116.

Step S316: Creating, by the central orchestrator, configuration information for an edge VPN, based on the information about networking configuration of the edge cloud. E.g. by S248: requesting, by the orchestrator of the central cloud or the CO functional module 114, edge VPN configuration information from the central VPN service or the CVPN server functional module 116, based on the information about a networking configuration of the edge cloud 100.

Step S318: Sending, by the anchoring registry, the configuration information for the edge VPN, to the connectivity controller. E.g. by S252: sending, by the anchoring registry or the AR functional module 112, the edge VPN configuration information, to an orchestrator of the edge cloud or the EO functional module 104.

Step S320: Creating, by an edge orchestrator, the edge VPN service, based on the configuration information for the edge VPN. E.g. by S258: creating, by an orchestrator of the edge cloud or the EO functional module 104, an edge VPN service or the EVPN client functional module 102, based on the edge VPN configuration information.

Step S322: Establishing a VPN connection between the edge VPN and the central VPN, whereby services are exposed among the edge and central clouds. E.g. by S260: establishing a VPN connection between the edge VPN service or the EVPN client functional module 102, and the central VPN service or the CVPN server functional module 116.

Thus, services from either one of the edge cloud 100 or the central cloud 101 are exposed in the edge cloud 100 and the central cloud 101.

Additionally or alternatively, the method 300 further comprises sending S240, S312 by the connectivity controller or the CC functional module 106, to the anchoring registry or the AR functional module 112, a presence notification of the edge cloud.

Additionally or alternatively, the method 300 further comprises setting up S256, by the connectivity controller or the CC functional module 106, a central network for the edge cloud.

Additionally or alternatively, the method 300 further comprises detecting S230, by the connectivity controller or the CC functional module 106, an accessibility to an external network and querying S232, by the connectivity controller or the CC functional module 106, a domain name server, DNS, service or the CDNS functional module 110 in the edge cloud about the address of the anchoring registry or the AR functional module 112.

Additionally or alternatively, the method 300 further comprises querying S234, by the DNS service of the edge cloud or the EDNS functional module 108, the DNS service in the central cloud or the CDNS functional module 110, about the address of the anchoring registry or the AR functional module 112.

Additionally or alternatively, the method 300 further comprises, after detecting S802, by the connectivity controller or the CC functional module 106, a failure in network access to the central network; detecting, by the connectivity controller or the CC functional module 106, within a preset time-out period that the central network is re-accessible; determining location of the edge cloud; re-establishing (S824) VPN connection, if the location of the edge cloud is unchanged since failure detection; if the location of the edge cloud is changed since failure detection, removing (S908, S910) current edge configuration, by an edge orchestrator and a central orchestrator, reconfiguring (S912) the edge network and central network cloud with updated edge configuration, and establishing a VPN connection between an edge VPN service and a central VPN service.

Figure 4:
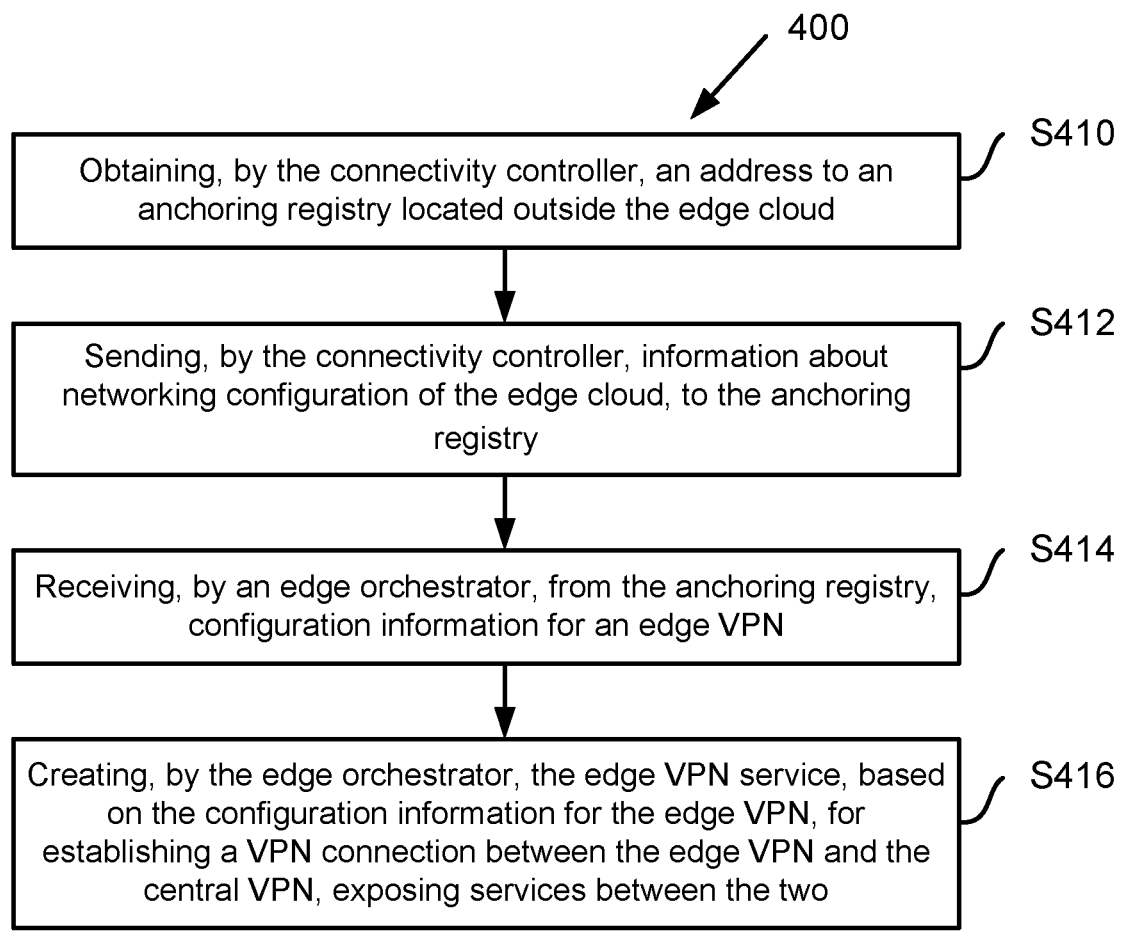
FIG. 4 shows a flowchart of a method according to one or more embodiments of the present disclosure.

FIG. 4 shows a flowchart of a method 400 according to one or more embodiments of the present disclosure. A method is provided for anchoring an edge cloud 100 to a central cloud 101. The method being performed in an edge cloud 100 and comprises obtaining S238, S410, by a connectivity controller or the CC functional module 106, an address to an anchoring registry of a central cloud or the AR functional module 112; sending S412, by the connectivity controller or the CC functional module 106, to the anchoring registry or the AR functional module 112, information about networking configuration of the edge cloud 100. In one embodiment, information about edge presence or registration is further included, and the AR functional module 112 starts a registration timer which expires unless the CC refreshes the registration. The method further comprises receiving S414, by an orchestrator of the edge cloud or the EO functional module 104, from an anchoring registry or the AR functional module 112, edge virtual private network, VPN, configuration information; and creating S416, by the orchestrator or the EO functional module 104, an edge VPN service in the edge cloud or the EVPN client functional module 102, such that a VPN connection can be established between the edge cloud 100 and the central cloud 101, whereby services in either one of the two, can be exposed in the edge cloud 100 and in the central cloud 101.

Figure 5:
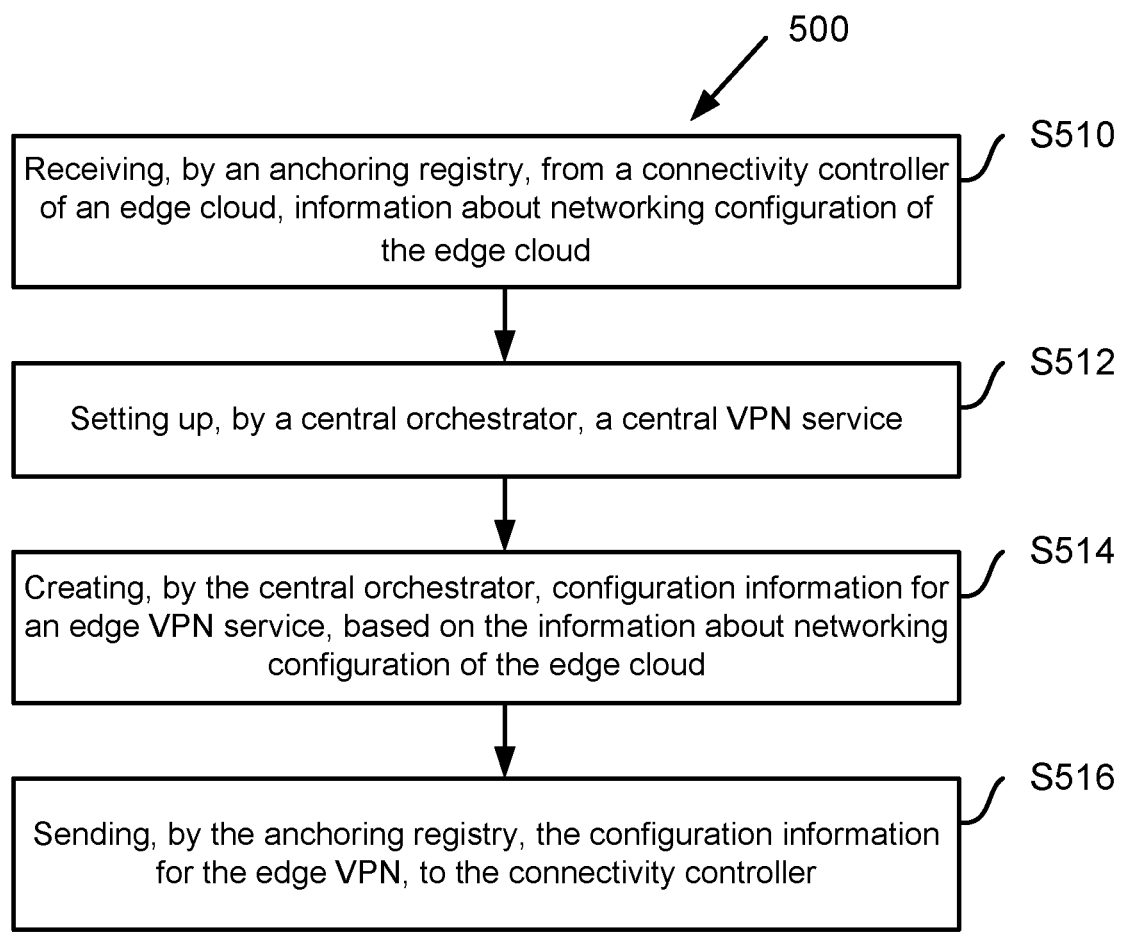
FIG. 5 shows a flowchart of a method according to one or more embodiments of the present disclosure.

FIG. 5 shows a flowchart of a method 500 according to one or more embodiments of the present disclosure. A method is provided for anchoring of an edge cloud 100 to a central cloud 101, the method being performed in the central cloud 101. The method comprising receiving S240, S510, by an anchoring registry or the AR functional module 112, from a connectivity controller of the edge cloud or the CC functional module 106, information about networking configuration of the edge cloud 100, setting up S246, S512, by an orchestrator of the central cloud or the CO functional module 114, a virtual private network, VPN, service in the central cloud or the CVPN server functional module 116, querying S248, S514, by the orchestrator or the CO functional module 114, configuration information for an edge VPN service or the EVPN client functional module 102, based on received information about networking configuration of the edge cloud 100, from the VPN service in the central cloud or the CVPN server functional module 116; and sending S250, S516, by the anchoring registry or the AR functional module 112, the edge VPN configuration information, to an orchestrator of the edge cloud or the EO functional module 104. In this way, a VPN connection can be established between the edge cloud and the central cloud, whereby services in either one of the two, can be exposed in the edge cloud and in the central cloud.

Figure 6:
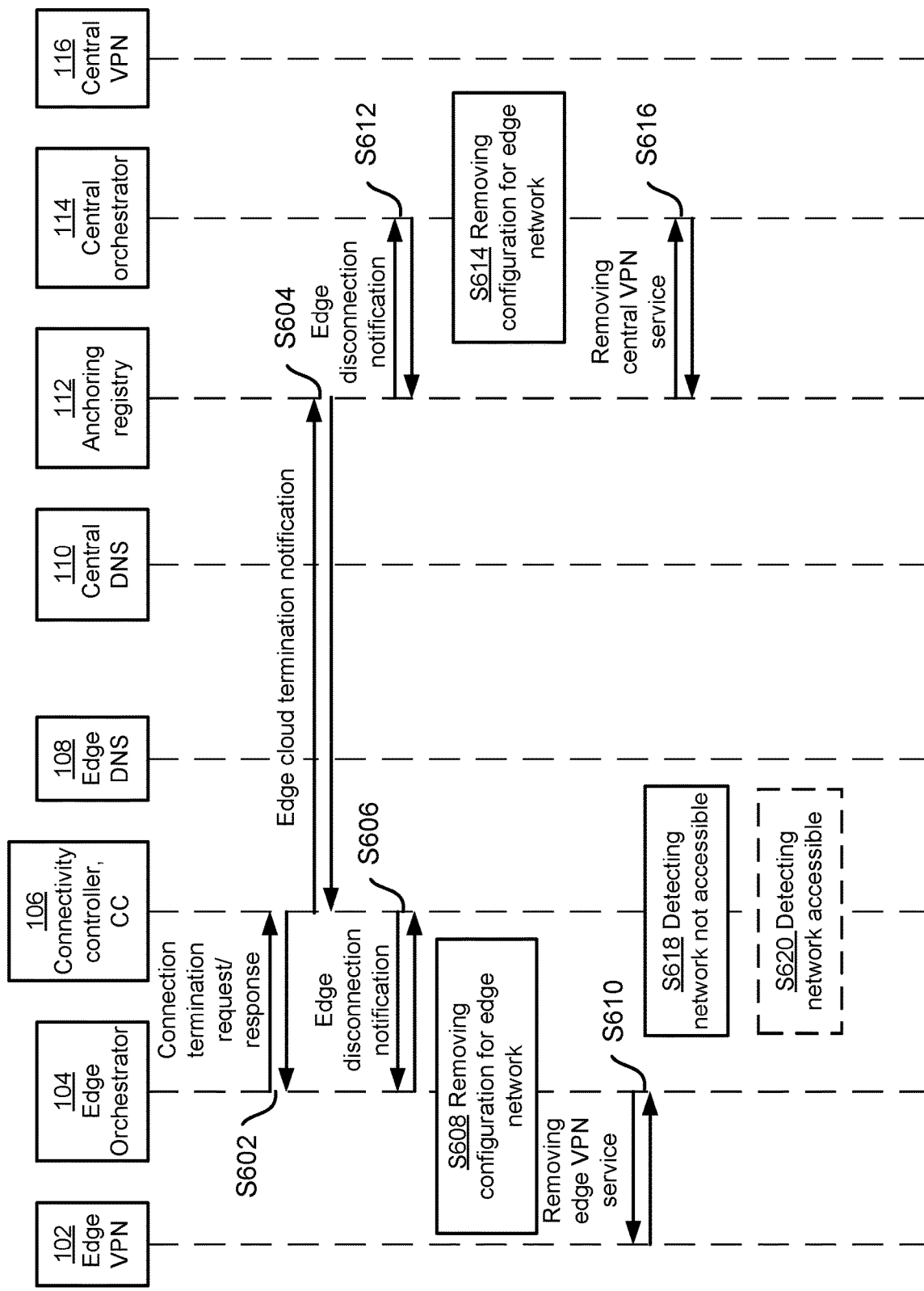
FIG. 6 shows a sequence flow of a method according to one or more embodiments of the invention.

FIG. 6 shows a sequence flow of a method according to one or more embodiments of the invention. The figure shows an embodiment where the VPN tunnel re-connects after a graceful disconnect. The method comprises:

Step S602: requesting, by the EO functional module 104, the CC functional module 106 to terminate the VPN connection between the edge VPN service or the EVPN client functional module 102, and the central VPN service or the CVPN server functional module 116. In other words, the edge orchestrator requests the CC to terminate the connection, or to undock.

Step S604: notifying, by the CC functional module 106, the AR functional module 112 that the VPN connection will be terminated. In other words, the CC notifies the AR that the edge cloud will terminate the VPN connection.

It should be noted that steps S604, S612 and S614 may also be performed in parallel to steps S602, S606, S608 and S610, even though they are presented as method steps in a sequence below.

Step S612: notifying, by the AR functional module 112, the CO functional module 114 that the edge cloud has terminated the VPN connection. In other words, the AR notifies the Central Orchestrator that the edge has disconnected.

Step S614: removing, by the CO functional module 114, the configuration for the edge network. In other words, the central orchestrator removes configuration for the edge cloud.

Step 616: removing, by the CO functional module 114, the VPN server-side service or the CVPN server functional module 116. In other words, the central cloud orchestrator removes the VPN server-side service (e.g. a virtual machine or Linux container) for the edge cloud. This will also terminate the VPN connection.

Step S606: notifying, by the CC functional module 106, the EO functional module 104 that the VPN connection is safe to disconnect. In other words, the CC notifies the Edge Orchestrator that the link is safe to disconnect.

Step S608: removing, by the EO functional module 104, the edge configuration. In other words, the edge orchestrator removes the configuration for the edge network.

Step S610: removing, by the EO functional module 104, the VPN client-side service or the EVPN client functional module 102. In other words, the edge cloud orchestrator removes the VPN client-side service.

In an optional step S618: detecting, by the CC functional module 106, that the network is not accessible. In other words, the CC detects that the network is not accessible.

In an optional step S620: detecting, by the CC functional module 106, that the network is accessible. In other words, the CC detects that the network is accessible.

Figure 7:
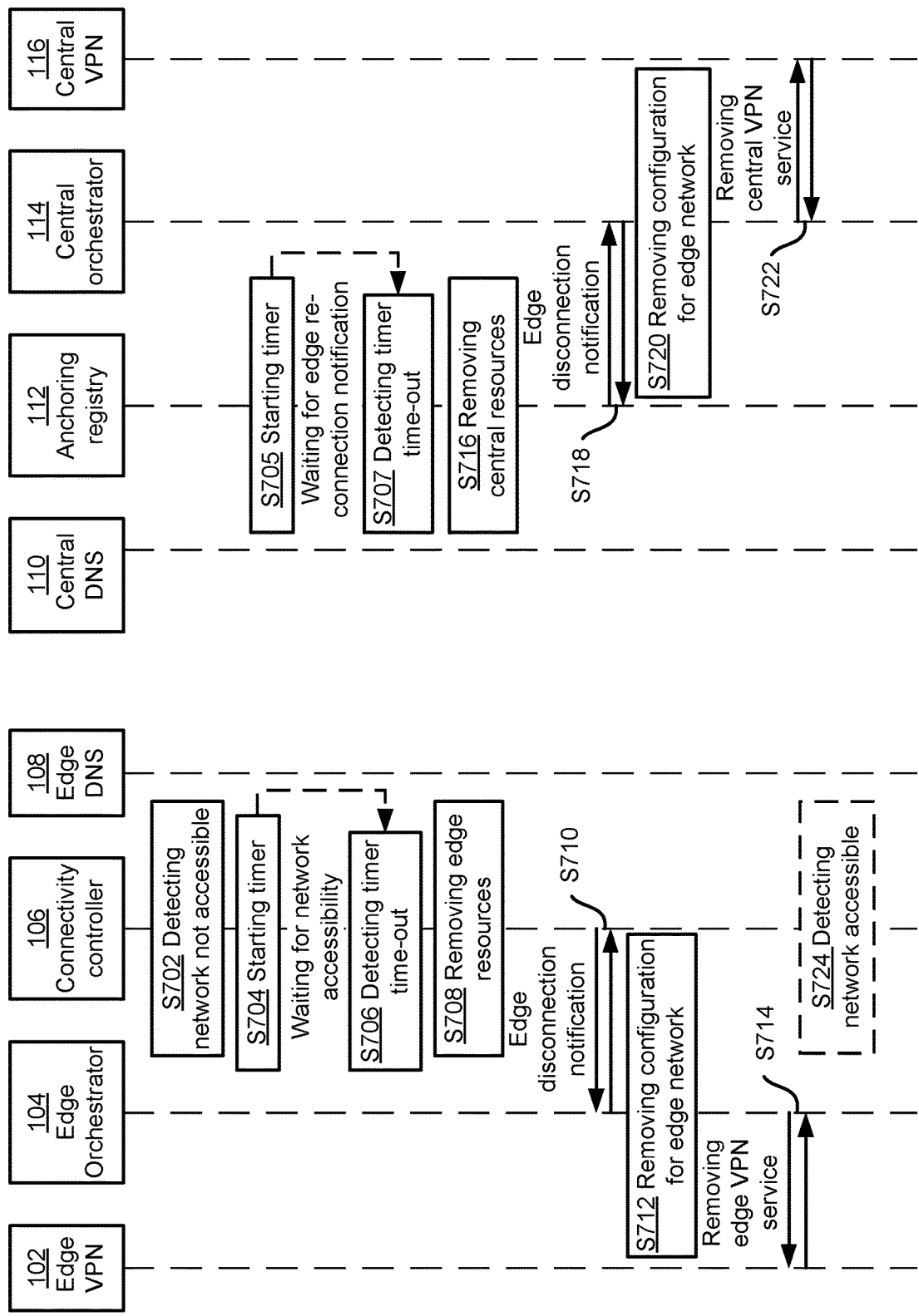
FIG. 7 shows a sequence flow of a method according to one or more embodiments of the invention.

FIG. 7 shows a sequence flow of a method according to one or more embodiments of the invention. The figure shows an embodiment where the VPN tunnel re-connects after an unsolicited disconnect, and within a range of an acceptable timeout. The method comprises:

Step 702: detecting, by the CC functional module 106, that the network is not accessible. In other words, the CC detects that the network is not accessible.

Step S704: starting, by the CC functional module 106, a timer. In other words, the CC sets a timer to wait for the link to come up. The AR can set its own central timer in Step S705, when it detects it has lost connection to the CC by monitoring the connection the CC used to publish the edge information. Instead of a "server" timer in the AR, the AR can choose to require the CC to periodically refresh the registration in order to keep it alive.

Step S706: detecting, by the CC functional module 106, that the timer has timed-out or expired.

Step S708: removing edge resources. In other words, if the registration times out, the AR can remove the configuration.

Step S710: notifying, by the CC functional module 106, the EO functional module 104 that the VPN connection is disconnecting.

Step S712: removing, by the EO functional module 104, the edge VPN configuration.

Step S714: removing, by the EO functional module 104, the edge VPN service or the EVPN client functional module 102.

In sequence or in parallel to the above described steps, the method further comprises.

Step S707: detecting, by the AR functional module 112, that the central timer has timed-out or expired.

Step S716: removing, by the AR functional module 112, central resources. In other words, if the registration times out, the AR can remove the configuration.

Step S718: notifying, by the AR functional module 112, the CO functional module 114, that the VPN connection is disconnecting.

Step S720: removing, by the CO functional module 114, the edge VPN configuration.

Step S722: removing, by the CO functional module 114, the central VPN service or the CVPN server functional module 116.

Figure 8:
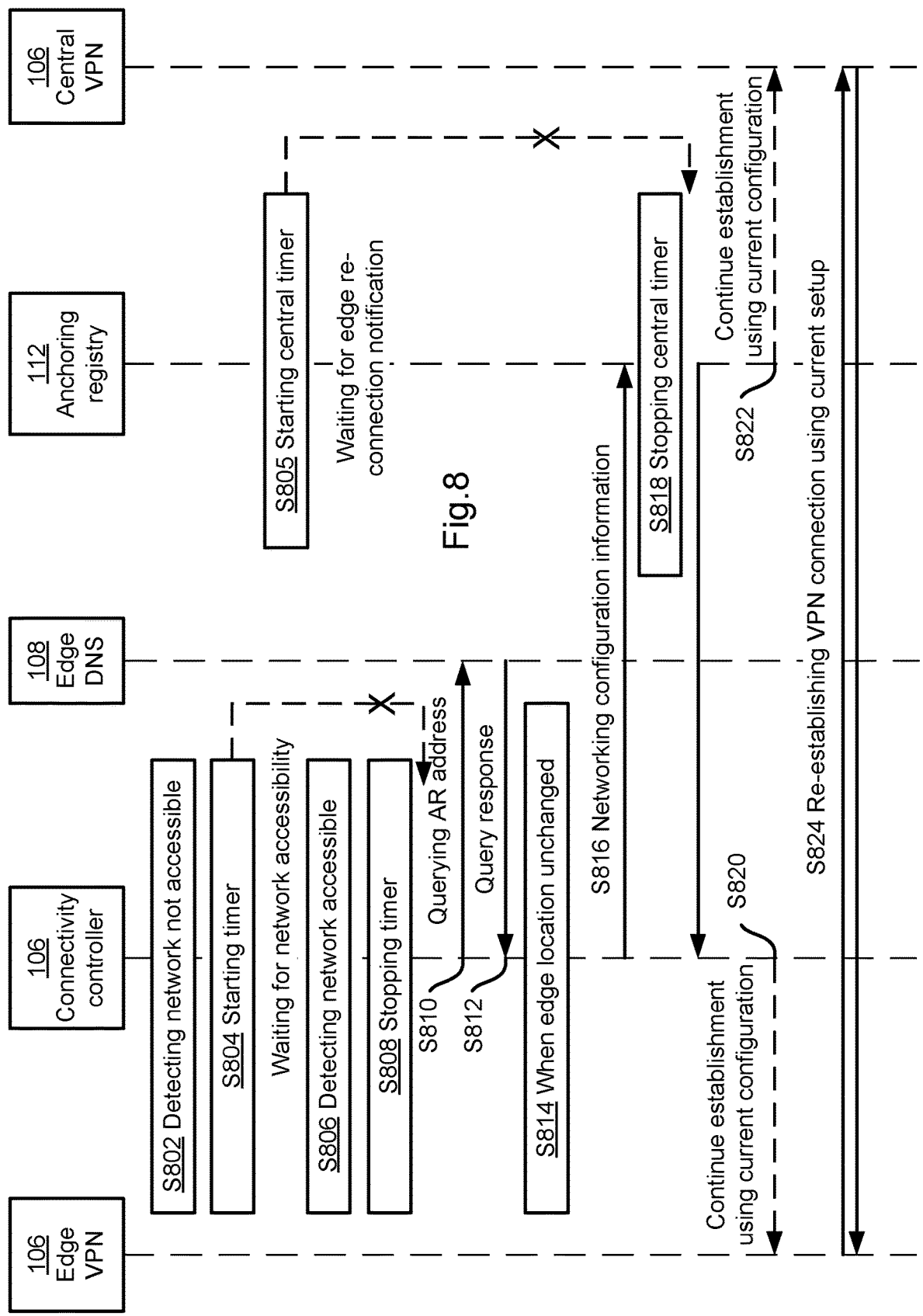
FIG. 8 shows a sequence flow of a method according to one or more embodiments of the invention.

FIG. 8 shows a sequence flow of a method according to one or more embodiments of the invention. The figure shows an embodiment where the VPN tunnel re-connects after an unsolicited disconnect, and within a range of an acceptable timeout. The method comprises:

Step S802: detecting, by the CC functional module 106, that the network is not accessible. In other words, the CC detects that the network is not accessible.

Step S804: starting, by the CC functional module 106, a timer. In other words, the CC sets a timer to wait for the link to come up. The AR can set its own central timer in Step S805, when it detects it has lost connection to the CC by monitoring the connection the CC used to publish the edge information. Instead of a "server" timer in the AR, the AR can choose to require the CC to periodically refresh the registration in order to keep it alive. If the registration times out, the AR can remove the configuration.

the CC functional module 106 detects that the network is accessible, e.g. receives a link-up notification from an external source.

Step 806: detecting, by the CC functional module 106, that the network is accessible, e.g. by receiving a link-up notification from an external source. In other words, the CC detects that the network is again accessible (e.g. receives a link-up notification from an external source).

Step S808: stopping the timer, by the CC functional module 106. In other words, the CC stops the timer.

In an optional Step S810: requesting, by the CC functional module 106, the address of the anchoring registry of a central cloud or the AR functional module 112, from the EDNS functional module 108. In other words, the CC queries the DNS service of the edge cloud of the address of the AR service. It should be noted that the DNS responses are normally cached in the client, and steps 4-5 are not necessarily performed. However, here we expected that the entry in the client's DNS cache has timed out.

In an optional Step S812: responding, by the EDNS functional module 108, with the address of the anchoring registry of a central cloud or the AR functional module 112 to the CC functional module 106. In other words, the edge DNS sends a cached DNS response to the CC. If the entry has already timed out in the cache, the edge DNS would query the information from the authoritative server see steps S232-S238 in FIG. 2A.

Step S814: determining, by the CC functional module 106, if a location of the edge cloud 100 has changed.

If it is determined that the location of the edge cloud 100 has not changed, the method further comprises the steps:

Step 816: sending, by the CC functional module 106, networking configuration information to the anchoring registry of a central cloud or the AR functional module 112, the networking configuration information comprising a current location of the edge cloud 100. In other words, if the edge's location has not changed, the CC re-publishes the current location to the AR, which stops its own timer and no further actions are needed. It should also be noted that if the server timer has already expired and resources are removed, the AR can signal this back to the CC. In this case, the CC can purge the existing configuration and the procedure continues defined as steps 21-38 in FIG. 3.

Step S818: stopping, by the AR functional module 112, the central timer.

In step Steps S820 and S822, the establishment using the current configuration is continued.

Step S824: re-establishing the VPN connection between the edge VPN service or EVPN client functional module 102 and the central VPN service or the CVPN server functional module 116.

Figure 9:
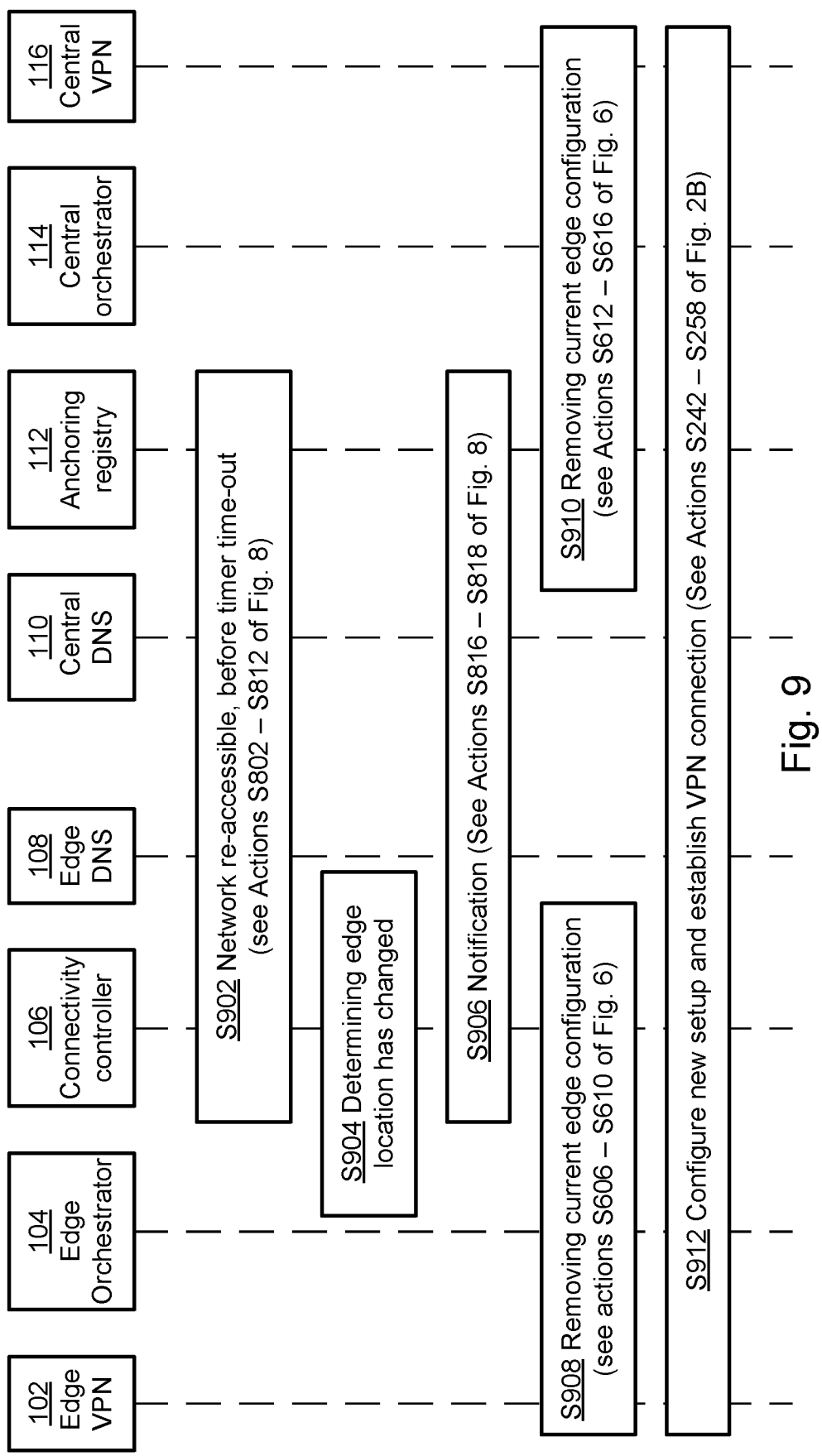
FIG. 9 shows an embodiment of the method according to the present disclosure.

FIG. 9 shows an embodiment of the method according to the present disclosure. If it is determined that the location of the edge cloud 100 has changed, the method further comprises the steps:

Step S902: see actions S802-S812 of FIG. 8.

Step S904/S814: determining, by the CC functional module 106, if a location of the edge cloud 100 has changed.

Step S906: notifying AR and stopping central timer, corresponding to Step S816-S818 of FIG. 8.

Step S908: removing, by the EO functional module 104, current edge configuration, corresponding to steps S606-S610 of FIG. 6.

Step S910: removing, CO functional module 114, current edge configuration, corresponding to steps S606-S610 of FIG. 6.

Step S912: configure new edge configuration and establish VPN connection, corresponding to Step S242-S258 of FIG. 2B.

In one embodiment, a computer program is provided and comprising computer-executable instructions for causing a cloud 100, 101, when the computer-executable instructions are executed on processing circuitry comprised in the cloud 100, 101, to perform any of the method steps described herein.

In one embodiment, a system or cloud environment is provided for anchoring an edge cloud to a central cloud, the system or cloud environment comprising comprising a central cloud 101 and an edge cloud 100 each comprising processing circuitry operative/adapted to perform the method steps herein. In an embodiment, the processing circuitry comprise a processor and a memory and wherein said memory is containing instructions executable by said processor to perform the method steps herein.

In one embodiment, first node for anchoring an edge cloud to a central cloud comprising processing circuitry operative/adapted to perform the method steps herein. In an embodiment, the processing circuitry comprises a processor and a memory and wherein said memory is containing instructions executable by said processor to perform the method steps herein.

In one embodiment, a second node for anchoring an edge cloud to a central cloud comprising processing circuitry operative/adapted to perform the method steps herein. In an embodiment, the processing circuitry comprise a processor and a memory and wherein said memory is containing instructions executable by said processor to perform the method steps herein. Finally, it should be understood that the invention is not limited to the embodiments described above, but also relates to and incorporates all embodiments within the scope of the appended independent claims.

The invention claimed is:

1. A method for anchoring an edge cloud to a central cloud, the method being performed in a cloud environment comprising a central cloud and an edge cloud, the method comprising:
   obtaining, by a connectivity controller of an edge cloud, an address of an anchoring registry of a central cloud;
   sending, by the connectivity controller, to the anchoring registry, information about networking configuration of the edge cloud;
   setting up, by an orchestrator of the central cloud, a virtual private network, VPN, service in the central cloud;
   requesting, by the orchestrator of the central cloud, edge VPN configuration information from the central VPN service, based on the information about networking configuration of the edge cloud;
   sending, by the anchoring registry, the edge VPN configuration information, to an orchestrator of the edge cloud;
   creating, by the orchestrator of the edge cloud, an edge VPN service, based on the edge VPN configuration information; and
   establishing a VPN connection between the edge VPN service and the central VPN service,
   whereby services from either one of the edge cloud or the central cloud are exposed in the edge cloud and the central cloud.

2. The method according to claim 1, further comprising sending, by the connectivity controller to the anchoring registry, a presence notification of the edge cloud.

3. The method according to claim 1, further comprising setting up, by the connectivity controller, a central network for the edge cloud.

4. The method according to claim 1, further comprising detecting, by the connectivity controller, an accessibility to an external network, and querying, by the connectivity controller, a domain name server, DNS, service in the edge cloud about the address of the anchoring registry.

5. The method according to claim 4, further comprising querying, by the DNS service of the edge cloud, the DNS service in the central cloud, about the address of the anchoring registry.

6. The method according to claim 1, after detecting, by the connectivity controller, a failure in network access to the central network;
   detecting, by the connectivity controller, within a preset time-out period that the central network is re-accessible;
   determining a location of the edge cloud;
   re-establishing VPN connection, if the location of the edge cloud is unchanged since failure detection;
   if the location of the edge cloud is changed since failure detection, the method further comprises:
   removing current edge configuration, by an edge orchestrator and a central orchestrator,
   reconfiguring the edge network and central network cloud with updated edge configuration, and
   establishing a VPN connection between an edge VPN service and a central VPN service.

7. A system or cloud environment for anchoring an edge cloud to a central cloud, the system or cloud environment comprising a central cloud and an edge cloud each comprising a processor; and a memory, said memory containing instructions executable by said processor, the system or cloud environment operative to
   obtain, by a connectivity controller of an edge cloud, an address of an anchoring registry of a central cloud;

send, by the connectivity controller, to the anchoring registry, information about networking configuration of the edge cloud;

set up, by an orchestrator of the central cloud, a virtual private network, VPN, service in the central cloud;

request, by the orchestrator of the central cloud, edge VPN configuration information from the central VPN service, based on the information about networking configuration of the edge cloud;

send, by the anchoring registry, the edge VPN configuration information, to an orchestrator of the edge cloud;

create, by the orchestrator of the edge cloud, an edge VPN service, based on the edge VPN configuration information; and establish a VPN connection between the edge VPN service and the central VPN service, whereby services from either one of the edge cloud or the central cloud are exposed in the edge cloud and the central cloud.

8. The system according to claim 7, further operative to send, by the connectivity controller to the anchoring registry, a presence notification of the edge cloud.

9. The system according to claim 7, further operative to set up, by the connectivity controller, a central network for the edge cloud.

10. The system according to claim 7, further operative to detect, by the connectivity controller, an accessibility to an external network, and querying, by the connectivity controller, a domain name server, DNS, service in the edge cloud about the address of the anchoring registry.

11. The system according to claim 10, further operative to query, by the DNS service of the edge cloud, the DNS service in the central cloud, about the address of the anchoring registry.

12. The system according to claim 7, operative to after detecting, by the connectivity controller, a failure in network access to the central network;

detect, by the connectivity controller, within a preset time-out period that the central network is re-accessible;

determine a location of the edge cloud;

re-establish VPN connection, if the location of the edge cloud is unchanged since failure detection;

if the location of the edge cloud is changed since failure detection, the system further operative to:

remove current edge configuration, by an edge orchestrator and a central orchestrator, reconfigure the edge network and central network cloud with updated edge configuration, and establish a VPN connection between an edge VPN service and a central VPN service.

13. A first node for anchoring an edge cloud to a central cloud comprising a processor; and a memory, said memory containing instructions executable by said processor, whereby said first node is operative to obtain, by a connectivity controller, an address to an anchoring registry of a central cloud;

send, by the connectivity controller, to the anchoring registry, information about networking configuration of the edge cloud;

receive, by an orchestrator of the edge cloud, from an anchoring registry, edge virtual private network, VPN, configuration information; and create, by the orchestrator, an edge VPN service in the edge cloud to establish a VPN connection between the edge VPN service of the edge cloud and the central VPN service of the central cloud, whereby services in either one of the two, can be exposed in the edge cloud and in the central cloud.

14. A second node for anchoring an edge cloud to a central cloud comprising a processor; and a memory, said memory containing instructions executable by said processor, whereby said second node is operative to receive, by an anchoring registry, from a connectivity controller of the edge cloud, information about networking configuration of the edge cloud;

set up, by an orchestrator of the central cloud, a virtual private network, VPN, service in the central cloud;

query, by the orchestrator, configuration information for an edge VPN service, based on received information about networking configuration of the edge cloud, from the VPN service in the central cloud; and send, by the anchoring registry, the edge VPN configuration information, to an orchestrator of the edge cloud, such that a VPN connection can be established between the edge cloud and the central cloud, whereby services in either one.

* * * * *